US009743331B1

(12) United States Patent
Ho et al.

(10) Patent No.: US 9,743,331 B1
(45) Date of Patent: Aug. 22, 2017

(54) TECHNIQUES FOR REMOTELY MANAGING DEVICE CONNECTIVITY IN RESPONSE TO CELLULAR NETWORK OUTAGES

(71) Applicant: Google Inc., Mountain View, CA (US)

(72) Inventors: Casey Kwok Ching Ho, San Jose, CA (US); Weihua Tan, Fremont, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 15/010,494

(22) Filed: Jan. 29, 2016

(51) Int. Cl.
*H04W 36/00* (2009.01)
*H04W 36/30* (2009.01)
*H04W 4/14* (2009.01)
*H04W 24/08* (2009.01)

(52) U.S. Cl.
CPC ............ *H04W 36/30* (2013.01); *H04W 4/14* (2013.01); *H04W 24/08* (2013.01)

(58) Field of Classification Search
None
See application file for complete search history.

(56) References Cited

U.S. PATENT DOCUMENTS

| 8,526,952 | B2* | 9/2013 | Shaheen | H04W 36/14 |
| | | | | 370/328 |
| 8,862,164 | B2* | 10/2014 | Chaturvedi | H04W 76/04 |
| | | | | 370/331 |
| 2007/0036120 | A1* | 2/2007 | Zhang | H04L 12/14 |
| | | | | 370/338 |
| 2008/0085707 | A1* | 4/2008 | Fadell | H04W 8/065 |
| | | | | 455/435.3 |
| 2010/0017861 | A1* | 1/2010 | Krishnaswamy | H04W 48/18 |
| | | | | 726/7 |
| 2011/0130140 | A1 | 6/2011 | Fadell | |
| 2011/0193718 | A1 | 8/2011 | Chevrette et al. | |
| 2011/0201338 | A1* | 8/2011 | Zou | H04W 36/0061 |
| | | | | 455/436 |
| 2011/0320588 | A1* | 12/2011 | Raleigh | H04W 36/245 |
| | | | | 709/224 |

(Continued)

OTHER PUBLICATIONS

PCT International Search Report and Written Opinion dated Mar. 3, 2017 for PCT International Application No. PCT/US2016/067078, 13 pages.

*Primary Examiner* — German J Viana Di Prisco
(74) *Attorney, Agent, or Firm* — RMCK Law Group, PLC

(57) ABSTRACT

Computer-implemented techniques involve detecting, by a server having one or more processors, a first cellular connection between a computing device and a first cellular network of a first cellular carrier associated with a mobile virtual network operator (MVNO), detecting, by the server, an outage of at least the first cellular network of the first cellular carrier, in response to detecting the outage of the first cellular network, determining, by the server, an alternate communication channel by which to communicate with the computing device, and transmitting, by the server, a carrier switch instruction to the computing device via the alternate communication channel, wherein receipt of the carrier switch instruction causes the computing device to: (i) terminate the first cellular connection and (ii) initiate a second cellular connection with another cellular network of different second cellular carrier associated with the MVNO.

24 Claims, 2 Drawing Sheets

(56) References Cited

U.S. PATENT DOCUMENTS

| | | | |
|---|---|---|---|
| 2014/0051446 A1* | 2/2014 | Rose | H04W 36/165 |
| | | | 455/436 |
| 2015/0230165 A1* | 8/2015 | Aminaka | H04W 48/18 |
| | | | 455/552.1 |
| 2015/0319602 A1 | 11/2015 | Tagg et al. | |
| 2016/0142447 A1* | 5/2016 | Mufti | H04L 65/1046 |
| | | | 370/260 |

* cited by examiner

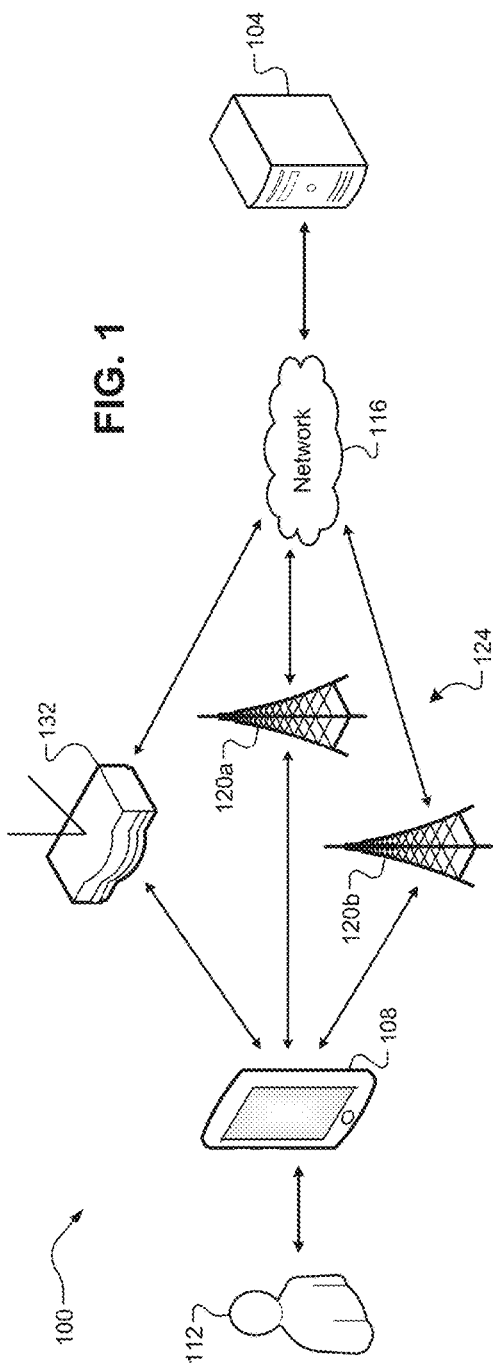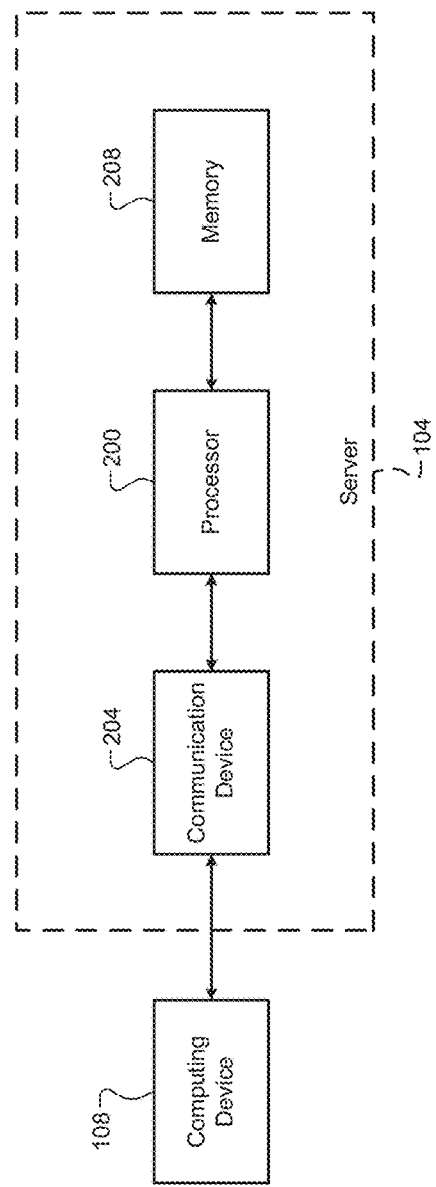

TECHNIQUES FOR REMOTELY MANAGING DEVICE CONNECTIVITY IN RESPONSE TO CELLULAR NETWORK OUTAGES

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A mobile network operator (MNO) is a provider of wireless communication services and that owns or controls all of the components necessary to deliver, to an end user, radio spectrum allocation. MNOs may also be referred to as wireless service providers, wireless carriers, cellular carriers, and/or mobile network carriers. MNOs may also sell access to their network services to mobile virtual network operators (MVNOs), which may purchase network services from a MNO at a wholesale rate, and then resell the network services to the end user. In this manner, MVNOs may not have the overhead costs associated with purchasing and maintaining all of the necessary components that are owned and controlled by the MNO. For a particular MNVO that is associated with multiple MNOs, there may be situations where it is desirable to a switch between MNOs at the end user's device.

SUMMARY

A computer-implemented technique, a server, and a non-transitory computer-readable medium are presented. The server can include a memory (e.g., the non-transitory computer-readable medium) having a set of instructions stored thereon that, when executed by one or more processors of the server, cause the server to perform a technique (e.g., the computer-implemented technique). The technique can include detecting a first cellular connection between a computing device and a first cellular network of a first cellular carrier associated with a mobile virtual network operator (MVNO). The technique can include detecting an outage of at least the first cellular network of the first cellular carrier. The technique can include in response to detecting the outage of the first cellular network, determining an alternate communication channel by which to communicate with the computing device. The technique can also include transmitting a carrier switch instruction to the computing device via the alternate communication channel, wherein receipt of the carrier switch instruction causes the computing device to: (i) terminate the first cellular connection and (ii) initiate a second cellular connection with another cellular network of different second cellular carrier associated with the MVNO.

A mobile computing device is also presented. In one implementation, the mobile computing device can include a memory configured to store a set of instructions, a communication device configured to transmit and receive information, and one or more processors configured to execute the set of instructions, which causes the one or more processors to perform operations. In one implementation, the operations can include controlling the communication device to establish a first cellular connection with a first cellular network of a first cellular carrier associated with an MVNO, receiving, by the communication device via an alternate communication channel, a carrier switch instruction indicative of a detected outage of at least the first cellular network of the first cellular carrier, and in response to receiving the carrier switch instruction, controlling the communication device to: (i) terminate the first cellular connection, and (ii) initiate a second cellular connection with another cellular network of different second cellular carrier associated with the MVNO.

In some embodiments, the outage is an expected future outage of at least the first cellular network of the first cellular carrier. In some embodiments, the other cellular network of the different second cellular carrier is not affected by the outage. In some embodiments, the alternate communication channel is a different second cellular network of the first cellular carrier. In some embodiments, the different second cellular network is a lesser generation cellular network than the first cellular network. In some embodiments, the different second cellular network is associated with a short message service (SMS) communication channel. In some embodiments, the alternate communication channel is a WiFi communication channel.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a diagram of an example computing system including an example server and an example mobile computing device according to some implementations of the present disclosure;

FIG. 2 is a functional block diagram of the example server of FIG. 1; and

DETAILED DESCRIPTION

Figure 3:
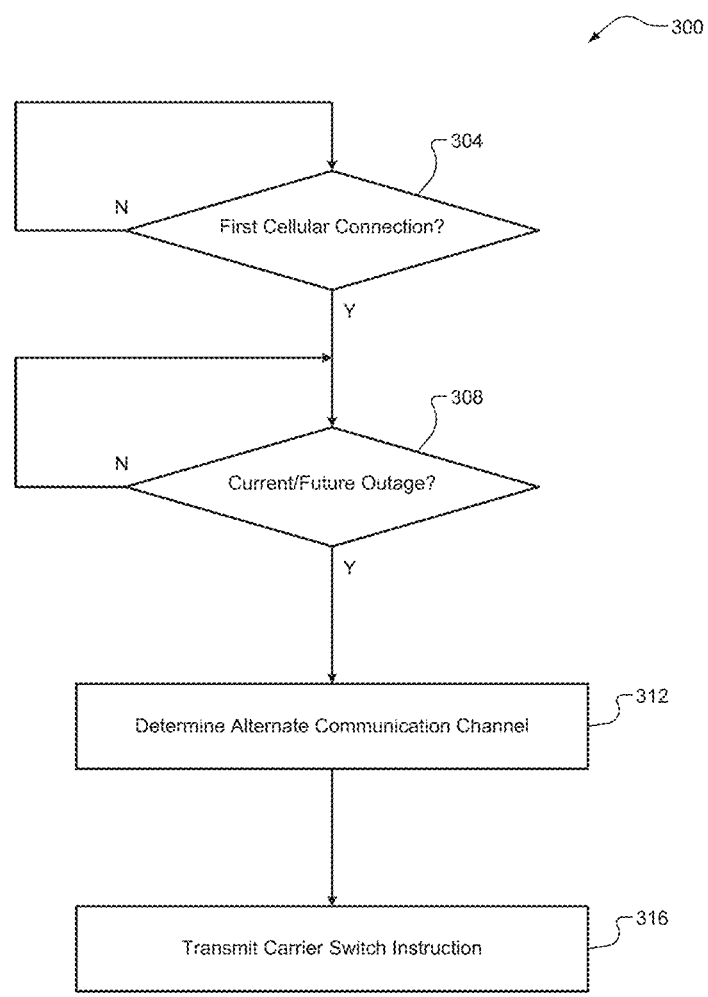
FIG. 3 is a flow diagram of an example technique for minimizing user disruption when switching between different cellular carriers of a mobile virtual network operator (MVNO) according to some implementations of the present disclosure.

The term "cellular carrier" as used hereinafter can refer to a mobile network operator (MNO), which can also refer to wireless service providers, wireless carriers, and/or mobile network carriers. As previously mentioned, for an MVNO that is associated with multiple MNOs, there may be situations where it is desirable to a switch between cellular carriers at an end user's mobile computing device. Each cellular carrier may operate a plurality of different cellular networks for a given area. These different cellular networks can be different generation cellular networks. Examples of the cellular networks include, but are not limited to, (i) first generation (1G), (ii) second generation (2G), (iii) third generation (3G), and (iv) fourth generation (4G) (also referred to as long-term evolution (LTE) or WiMax). When there is an outage for a cellular network that a mobile computing device is currently connected to, the mobile computing device may need to switch cellular networks in order to avoid a significant loss of connectivity.

In some cases, all of the cellular networks of a particular cellular carrier can experience an outage. In other cases, only one or some of the cellular networks of the particular cellular carrier can experience an outage. When there is an outage, however, the mobile computing device may not receive data transmissions via its current cellular network and thus does not know whether there is an outage for the current cellular network or, in some cases, the entire current cellular carrier. In other words, the mobile computing device may be unable to discern an outage from a poor network connection. Conventional techniques may include periodically switching between different cellular networks of different cellular carriers and determining a best cellular connection. Such techniques, however, when performed unnecessarily and not in response to an outage, may result in increased data costs and/or decreased battery life of the user's mobile computing device.

Accordingly, techniques are presented for remotely managing device connectivity in response to cellular network outages. These cellular network outages can be either current outages or expected/future outages. For example, there may be a future scheduled repair/service that can cause the outage. The term "outage" as used herein may refer to a signal strength or data transmission rate of a particular cellular network that is less than an outage threshold (e.g., approximately zero). The techniques provide for detecting an outage (current of future) of a current cellular network to which a computing device is connected. This cellular network can be one of a plurality of cellular networks (voice, 3G, 4G, etc.) associated with a particular cellular carrier. The particular cellular carrier can also be one of a plurality of cellular carriers associated with an MVNO. In response to detecting the outage at a server, the server can determine an alternate communication channel by which to communicate with the computing device. This alternate communication channel can be an alternate cellular connection (e.g., short messaging service (SMS) when only voice is available, 3G when 4G is experiencing an outage, etc.) or a computing network (i.e., non-cellular) connection (e.g., WiFi). Using the alternate communication channel, the server can then transmit to the computing device instructions to (i) terminate the current cellular connection and (ii) initiate a different cellular connection with a different second cellular carrier associated with the MVNO.

Referring now to FIG. 1, an example computing system 100 is illustrated. The computing system 100 can include an example server 104 according to some implementations of the present disclosure. The server 104 can communicate with an example mobile computing device 108, according to some implementations of the present disclosure, via a network 116. Examples of the mobile computing device 108 include a mobile phone, a tablet computer, and a laptop computer. While a mobile computing device 108 is shown and described herein, a desktop computer or other non-mobile computing device could also be implemented. A user 112 can be associated with and can operate the mobile computing device 108. The network 116 can be a local area network (LAN), a wide area network (WAN), e.g., the Internet, or some combination thereof. The mobile computing device 108 can connect to the network 116 via different types of connections. One example connection is a cellular connection to a cellular network. A different cellular network can be provided by first and second cellular carriers 120a, 120b (collectively "cellular carriers 120").

The cellular carriers 120 can each be associated with an MVNO 124. For example, the MVNO 124 may purchase network services from the cellular carriers 120 and resell the network services to the end-user (e.g., user 112 and her/his mobile computing device 108). The cellular carriers 120a, 120b, however, may otherwise be unaffiliated with each other. The server 104, however, may be associated with each of the cellular carriers 120 and thus may know when one or more of the cellular carriers 120 is/are experiencing a cellular network outage. In some implementations, one or more servers, which can be in communication with each other, can be associated with each cellular carrier 120, and thus the outage notification could be provided to the server 104 from another server. Another example connection is a WiFi connection to a WiFi network. The WiFi network can be managed by wireless computer router/modem 132.

Referring now to FIG. 2, a functional block diagram of the example server 104 is illustrated. The server 104 can include a processor 200, a communication device 204, and a memory 208. The term "processor" as used herein can refer to both a single processor and multiple processors operating in a parallel or distributed architecture. The processor 200 can control operation of the server 104, including, but not limited to, loading/executing an operating system of the server 104, controlling communication via the communication device 204, and controlling read/write operations at the memory 208. The communication device 204 can include any suitable components for communication with the network 116 via the cellular carriers 120 or the router/modem 132, such as a transceiver. The memory 208 can be any suitable storage medium (flash, hard disk, etc.) configured to store information at the server 104, such as a set of instructions for execution by the processor 200. While the components 200, 204, and 208 are shown as being part of the server 104, it will be appreciated that the mobile computing device 108 can have the same of similar components.

The server 104 can also be configured to perform at least a portion of the techniques of the present disclosure. As previously discussed, the server 104 may be associated with one or more of the cellular carriers 120 of the MVNO 124. In this manner, the server 104 may detect current or expected/future outages of one or more cellular networks of a particular cellular carrier 120. For example, the expected/future outages may correspond to scheduled maintenance on components of a particular cellular network. Alternatively, for example, an outage may be reported by other devices, such as based on users associated with the cellular carrier reporting connectivity issues via another communication medium. While the server 104 may directly know of the outage, the server 104 may also be notified of the outage by another device, such as another server.

The server 104 can initially detect a first cellular connection between the mobile computing device 108 and a first cellular network (e.g., 4G) of the first cellular carrier 120a. For example, the establishment of this first cellular connection could be reported to the server 104 by the mobile computing device 108 or another computing device. After detecting this first cellular connection, the server 104 can monitor to detect an outage of the first cellular network of the first cellular carrier 120a. When the outage is detected, the server 104 can determine an alternate communication channel by which to communicate with the mobile computing device 108. More particularly, because there is a current or expected outage of the first cellular network of the first cellular carrier 120a, the mobile computing device 108 does not have connectivity to be notified by the server 104 to switch cellular carriers.

The alternate communication channel can include at least one of an alternate cellular network of the first cellular carrier 120a and a non-cellular (e.g., computing) network. In some implementations, the alternate cellular network may be a lesser generation cellular network (e.g., 3G) of the first cellular carrier 120a. For example, the alternate cellular network may be associated with the SMS communication medium or another suitable text messaging protocol. The non-cellular or computing network may be a WiFi computing network. For example, the mobile computing device 108 may be simultaneously connected to the WiFi computing network or may automatically switch to the WiFi computing network upon the outage of the first cellular network. In some implementations, multiple alternate communication channels may exist. In these situations, only one notification could be sent via a preferred alternate communication channel (e.g., WiFi before SMS) or a notification could be sent via each alternate communication channel. The preferred alternate communication channel could be user-defined or predefined based on expected connection speed and/or cost. For example, WiFi may be preferred because it is typically faster than SMS and is typically free whereas SMS may cost the user money.

After determining the alternate communication channel, the server 104 can transmit a carrier switch instruction to the mobile computing device 108 via the alternate communication channel. In response to receiving the carrier switch instruction, the mobile computing device 108 can switch its cellular connection to a different cellular network of the different second cellular carrier 120b of the MVNO 124. This switching can involve the mobile computing device 108 terminating the first cellular connection and initializing a second cellular connection to the different cellular network of the different cellular carrier 120b. Thus, for an expected or future outage, the mobile computing device 108 may switch cellular carriers prior to the actual outage, thereby eliminating a major disturbance in connectivity. The switch to the different second cellular carrier 120b may be preferred because a faster (e.g., higher generation) cellular network (e.g., 4G) may be available on the different cellular network 120b but may be experiencing the outage on the first cellular carrier 120a.

In some implementations, receipt of the carrier switch instruction can cause the mobile computing device 108 to display information to the user 112. For example, this information may include a notification that the outage has been detected and the carrier switch is being performed. In some implementations, the mobile computing device 108 may query the user 112 for permission to switch to the different second cellular carrier 120b. For example, the second cellular carrier 120b may have higher data rates than the first cellular carrier and thus the user 112 may wish to remain disconnected or connected to a computing network, such as the WiFi network. While two cellular carriers 120 are illustrated and discussed herein, these techniques can extend to three or more different cellular carriers. For example, two of the three cellular carriers may be experiencing an outage on their best/fastest cellular networks, and thus the mobile computing device 108 may be instructed to perform a carrier switch to the remaining cellular carrier and its faster available cellular network.

Because the server 104 effectively knows the maintenance schedule, the server 104 can determine when the outage is expected to end. Based on this information, the server 104 can inform the mobile computing device 108 of when to switch back or reconnect to the first cellular network. For example, the first cellular network may have been previously determined to be a best or optimal cellular network and thus reconnecting to it may be preferred. In such situations, the server 104 may transmit another carrier switch instruction that causes the mobile computing device 108 to terminate the second cellular connection with the second cellular network of the second cellular carrier 120b and reestablish the first cellular connection with the first cellular network of the first cellular carrier 120a. Alternatively, the server 104 may notify the mobile computing device 108 of the anticipated end of the outage at the time of the original carrier switch instruction and the mobile computing device 108 can then itself perform the carrier switch back to the first cellular connection at the appropriate time.

Referring now to FIG. 3, a flow diagram of an example technique 300 for managing device connectivity in response to cellular network outages is illustrated. At 304, the server 104 can detect a first cellular connection between the mobile computing device 108 and a first cellular network of the first cellular carrier 120a associated with the MVNO 124. When the first cellular connection is detected, the technique 300 can proceed to 308. Otherwise, the technique 300 can return to 304. At 308, the server 104 can detect an outage of at least the first cellular network of the first cellular carrier 120a. When the outage is detected, the technique 300 can proceed to 312. Otherwise, the technique 300 can return to 308. At 312, the server 104 can determine an alternate communication channel by which to communicate with the mobile computing device 108. At 316, the server 104 can transmit a carrier switch instruction to the mobile computing device 108 via the alternate communication channel. Receipt of the carrier switch instruction can cause the mobile computing device 108 to (i) terminate the first cellular connection and (ii) initiate a second cellular connection with the different second cellular carrier 120b associated with the MVNO 124. The termination of the first cellular connection and the initiation of the second cellular connection may overlap or at least partially occur simultaneously (e.g., when the mobile computing device 108 has multiple communication devices 204, such as multiple cellular radios or multiple transceivers). The technique 300 can then end or return to 304 for one or more additional cycles.

Further to the descriptions above, a user may be provided with controls allowing the user to make an election as to both if and when systems, programs or features described herein may enable collection of user information (e.g., information about a user's current location or about the user's current cellular contract/billing plan), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
   detecting, by a server having one or more processors, a first cellular connection between a computing device and a first cellular network of a first cellular carrier associated with a mobile virtual network operator (MVNO);
   detecting, by the server, an outage of at least the first cellular network of the first cellular carrier;
   in response to detecting the outage of the first cellular network, determining, by the server, an alternate communication channel by which to communicate with the computing device; and
   transmitting, by the server, a carrier switch instruction to the computing device via the alternate communication channel, wherein receipt of the carrier switch instruction causes the computing device to control its communication device to:
   (i) terminate the first cellular connection, and
   (ii) initiate a second cellular connection with another cellular network of a different second cellular carrier associated with the MVNO,
   wherein upon initiating the second cellular connection, the computing device is simultaneously connected to both (a) the server via the alternate communication channel (b) the other cellular network of the different second cellular carrier via the second cellular connection.

2. The computer-implemented method of claim 1, wherein detecting the outage includes determining, by the server, an expected future outage of at least the first cellular network of the first cellular carrier.

3. The computer-implemented method of claim 1, wherein the alternate communication channel is a different second cellular network of the first cellular carrier.

4. The computer-implemented method of claim 3, wherein the different second cellular network is a lesser generation cellular network than the first cellular network.

5. The computer-implemented method of claim 4, wherein the different second cellular network is associated with a short message service (SMS) communication channel.

6. The computer-implemented method of claim 1, wherein the alternate communication channel is a WiFi communication channel.

7. The computer-implemented method of claim 1, further comprising detecting, by the server, that the other cellular network of the different second cellular carrier is not affected by the outage.

8. A server comprising a memory having a set of instructions stored thereon that, when executed by one or more processors of the server, cause the server to perform operations comprising:
   detecting a first cellular connection between a computing device and a first cellular network of a first cellular carrier associated with a mobile virtual network operator (MVNO);
   detecting an outage of at least the first cellular network of the first cellular carrier;
   in response to detecting the outage of the first cellular network, determining an alternate communication channel by which to communicate with the computing device; and
   transmitting a carrier switch instruction to the computing device via the alternate communication channel, wherein receipt of the carrier switch instruction causes the computing device to control its communication device to:
   (i) terminate the first cellular connection, and
   (ii) initiate a second cellular connection with another cellular network of a different second cellular carrier associated with the MVNO,
   wherein upon initiating the second cellular connection, the computing device is simultaneously connected to both (a) the server via the alternate communication channel (b) the other cellular network of the different second cellular carrier via the second cellular connection.

9. The server of claim 8, wherein detecting the outage includes determining, by the server, an expected future outage of at least the first cellular network of the first cellular carrier.

10. The server of claim 8, wherein the alternate communication channel is a different second cellular network of the first cellular carrier.

11. The server of claim 10, wherein the different second cellular network is a lesser generation cellular network than the first cellular network.

12. The server of claim 11, wherein the different second cellular network is associated with a short message service (SMS) communication channel.

13. The server of claim 8, wherein the alternate communication channel is a WiFi communication channel.

14. The server of claim 8, wherein the operations further comprise detecting, by the server, that the other cellular network of the different second cellular carrier is not affected by the outage.

15. A non-transitory computer-readable medium having a set of instructions stored thereon that, when executed by one or more processors of a server, cause the server to perform operations comprising:
   detecting a first cellular connection between a computing device and a first cellular network of a first cellular carrier associated with a mobile virtual network operator (MVNO);
   detecting an outage of at least the first cellular network of the first cellular carrier;
   in response to detecting the outage of the first cellular network, determining an alternate communication channel by which to communicate with the computing device; and
   transmitting a carrier switch instruction to the computing device via the alternate communication channel, wherein receipt of the carrier switch instruction causes the computing device to control its communication device to:
   (i) terminate the first cellular connection, and
   (ii) initiate a second cellular connection with another cellular network of a different second cellular carrier associated with the MVNO,
   wherein upon initiating the second cellular connection, the computing device is simultaneously connected to both (a) the server via the alternate communication channel (b) the other cellular network of the different second cellular carrier via the second cellular connection.

16. The computer-readable medium of claim 15, wherein detecting the outage includes determining, by the server, an expected future outage of at least the first cellular network of the first cellular carrier.

17. The computer-readable medium of claim 15, wherein the alternate communication channel is a different second cellular network of the first cellular carrier.

18. The computer-readable medium of claim 17, wherein the different second cellular network is a lesser generation cellular network than the first cellular network.

19. The computer-readable medium of claim 18, wherein the different second cellular network is associated with a short message service (SMS) communication channel.

20. The computer-readable medium of claim 15, wherein the alternate communication channel is a WiFi communication channel.

21. A mobile computing device, comprising:
a memory configured to store a set of instructions;
a communication device configured to transmit and receive information; and
one or more processors configured to execute the set of instructions, which causes the one or more processors to perform operations comprising:
controlling the communication device to establish a first cellular connection with a first cellular network of a first cellular carrier associated with a mobile virtual network operator (MVNO);
receiving, by the communication device via an alternate communication channel, a carrier switch instruction indicative of a detected outage of at least the first cellular network of the first cellular carrier; and
in response to receiving the carrier switch instruction, controlling the communication device to:
(i) terminate the first cellular connection, and
(ii) initiate a second cellular connection with another cellular network of a different second cellular carrier associated with the MVNO,
wherein upon initiating the second cellular connection, the mobile computing device is simultaneously connected to both (a) the server via the alternate communication channel (b) the other cellular network of the different second cellular carrier via the second cellular connection.

22. The mobile computing device of claim 21, wherein the alternate communication channel is a WiFi communication channel.

23. The mobile computing device of claim 21, wherein the alternate communication channel is a lesser generation cellular network of the first cellular carrier.

24. The mobile computing device of claim 21, wherein the alternate communication channel is a different cellular network of the first cellular carrier that is associated with a short message service (SMS) communication channel.

* * * * *